Patented June 1, 1948

2,442,692

UNITED STATES PATENT OFFICE 2,442,692

RADIO NAVIGATION SYSTEM

Paul F. G. Holst, Mount Healthy, Ohio, and Loren R. Kirkwood, Oaklyn, N. J., assignors to Radio Corporation of America, a corporation of Delaware Application July 10, 1946, Serial No. 682,500

15 Claims. (Cl. 343—103)

Our invention relates to radio navigation systems and particularly to systems of the type utilizing the time difference in the propagation of radio pulses from synchronized ground stations.

Navigation systems of this type employ pairs of synchronized ground transmitting stations that emit radio pulses having a fixed time relation. Each pair of ground stations preferably transmits pulses at an assigned individual repetition rate for the purpose of station selection. The pulses are broadcast so that they may be received by means of equipments located in the aircrafts or ships whose positions are to be determined. By means of the receiving equipment, the operator on the craft determines the time difference between the pulses from the two transmitter stations of one pair as they arrive at the receiver. Since the radio pulses travel from the ground transmitters to the receiver at a known propagation rate (i. e., at the velocity of light), it is known that the position of the craft is at some point on a line corresponding to the time difference reading. By obtaining the time difference reading from a second pair of ground stations, a second line corresponding to the second time difference reading is obtained, and the intersect point of the two lines is the position of the craft. Special maps having the "time difference" lines printed thereon for the several pairs of ground stations are provided for use with the navigation system.

In order to measure the time difference in the arrival of successive pulses from a pair of ground stations, the receiving equipment is arranged to generate timing marker pulses, that have known, fixed time intervals between them. The receiving equipment is also arranged to provide pulses, which may be adjusted to have a definite time relation to time of arrival of the station pulses. These pulses are provided for the purpose of driving or synchronizing cathode-ray deflecting circuits. These deflecting circuits produce cathode-ray sweep traces on which the marker pulses and/or the received ground station pulses are displayed.

For the purpose of selecting a particular pair of ground stations, the operator selects the particular pulse repetition rate for the driving or synchronizing pulses corresponding to the repetition period of the pulses transmitted from said pair whereby the deflecting circuits may be synchronized with the received pulses from the selected pair of ground stations. Thus a particular pair of ground stations is selected at the receiver apparatus by turning a station selection switch to the position indicated on the receiver panel for obtaining sweep synchronizing pulses having the same repetition period as that of the pulses being transmitted from the selected pair of ground stations. Now the received pulses from the selected pair of ground stations can be made to appear stationary on the cathode-ray sweep or trace whereas those received from the other pairs of ground stations will move along the same trace. The pulses from the two transmitter stations of a selected pair will be referred to as A and B pulses, respectively, and the B pulse is identified in the present system as the pulse that occurs after or follows the mid-point of the other pulse period. In operation, the A and B pulses are displayed on two cathode-ray traces, thereby enabling the operator to adjust the coarse-delay and fine-delay multivibrators so that the time difference between the pulses driving or synchronizing the cathode-ray deflecting circuits equals exactly the time difference between A and B pulses.

This adjustment is accomplished by first setting the B pulse at the left end of a slow-sweep, when the receiving apparatus is switched to an operating position marked #1. The A pulse will then appear in the same cathode ray trace and a variable index marker may now be located under the A pulse, this being done by adjusting coarse-delay and fine-delay multivibrators. The apparatus is then switched to a #2 fast-sweep operation position so that the A and B pulses appear on two fast-sweep traces, respectively. The starting time of the fast-sweep trace on which the A pulse appears coincides with the start of the variable index marker, while the starting time of the fast-sweep trace on which the B pulse appears, coincides with the start of the slow-sweep trace. Therefore, by further adjustment of the delay multivibrators, the adjustable fast-sweep wave is caused to start at the proper time to bring the A and B pulses into alignment. In order to insure exact alignment, the A and B pulses should be made to have the same amplitude, and an amplitude balance control circuit being provided for this purpose. After these adjustments have been made the time difference between the starts of the fast sweeps will exactly equal the time difference between the A and B pulses from the transmitters. Thus time difference may be measured with the apparatus switched to a #4 operation position by first counting the 1000 μ. s. timing intervals appearing on the slow-sweep trace between the variable index marker and the right end of the trace. Thus, the desired time difference between pulses is determined to a fractional 1000 μ. s. period. A precise determination of the fractional 1000 μ. s. period is made possible by switching the apparatus to a #5 operation position and utilizing the fast-sweep deflecting waves, one of which starts simultaneously with the slave index marker and lasts for the said fractional period. Thus, the 10 μ. s. and 100 μ. s. timing marks occurring during the fractional period appear on an expanded trace and may be counted, as described hereinafter, to determine the fractional 1000 μ. s. interval.

An object of the present invention is to provide an improved method of and means for determining the time difference between electrical pulses.

A further object of the invention is to provide improved receiving equipment for a radio navigation system of the type utilizing the propagation of radio pulses from pairs of synchronized ground stations.

A still further object of the invention is to provide an improved method of and means for indicating the time difference between radio pulses transmitted from synchronized ground stations.

A still further object of the invention is to provide an improved method of and means for obtaining a simple time marker presentation in a radio navigation system of the above-mentioned type.

The invention will be better understood from the following description taken in connection with the accompanying drawing in which.

In the several figures, similar parts are indicated by similar reference characters.

The pulse generator and station selection circuit which will now be described under the headings The Pulse Generator Unit and Count Subtraction for Station Selection is the same as that described and claimed in application Serial No. 552,146, filed August 31, 1944, in the name of Earl Schoenfeld and entitled Timing marker and station selection apparatus.

THE PULSE GENERATOR UNIT

Figure 1:
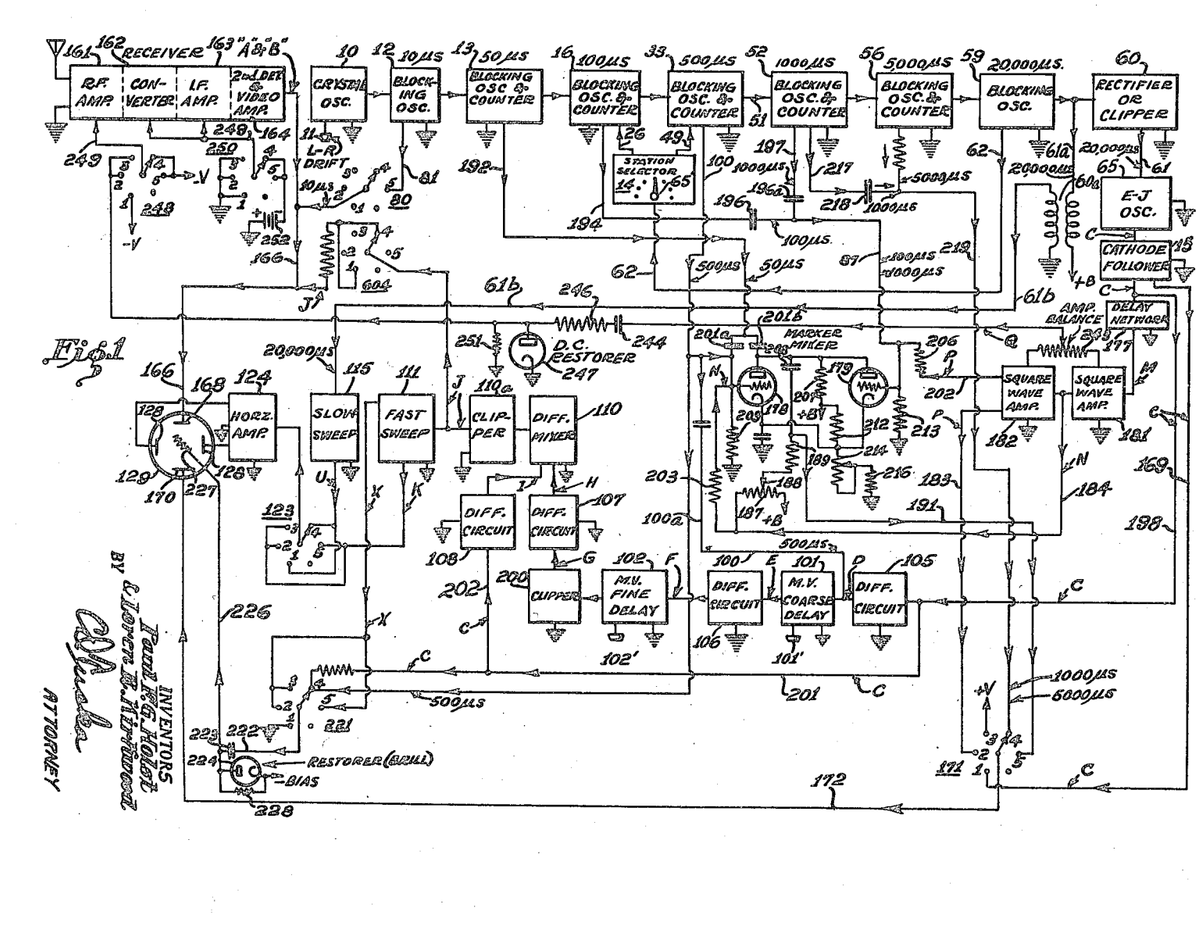
Figure 1 is a block and circuit diagram of navigation receiving apparatus designed in accordance with one embodiment of the invention.
Figures 2, 3:
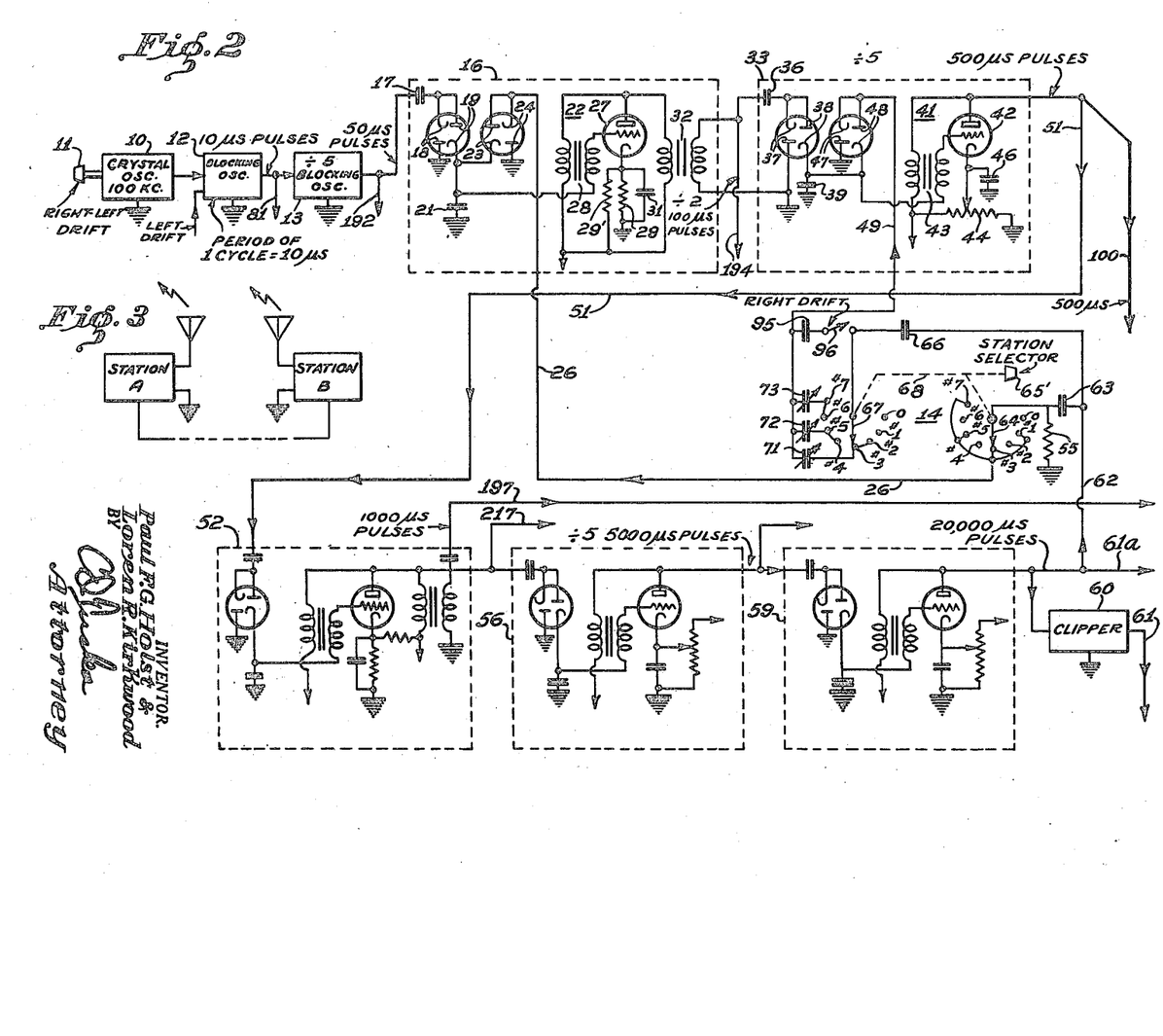
Figure 2 is a block and circuit diagram of the pulse generating unit shown in Fig. 1.
Figure 3 is a block diagram representing one pair of ground radio transmitter stations of the navigation system which transmit A and B pulses, respectively.

In Fig. 1, the pulse generating circuit for producing the timing marker pulses and for producing the controlling or synchronizing pulses that control the cathode-ray deflection is shown in block diagram at the top of the figure. It is shown in detail in Fig. 2. Referring to Figs. 1 and 2, the pulse generator comprises a crystal oscillator 10 that produces a sine wave voltage of stable frequency which in the example illustrated is 100 kilocycles per second, the repetition period being 10 microseconds. The frequency of the crystal oscillator output may be increased or decreased slightly by a manual adjustment as indicated at the control knob 11 for obtaining a "fine" right or left drift of a received pulse on a cathode-ray sweep trace, the rate of drift being slow enough to be useful on fast-sweep presentation.

The crystal oscillator 10 drives a blocking oscillator 12 or the like to produce periodic pulses which, in the present example, also recur at the rate of 100 kc. per second. The repetition period or time interval between successive pulses is, therefore, 10 microseconds.

The frequency of the 10 μ. s. pulses is divided by five by means of a suitable frequency divider 13 such as a second blocking oscillator to produce 50 μ. s. pulses. While specific values are being given for the several frequency division steps, the invention is not limited to these particular values.

The 50 μ. s. pulses are applied to a frequency divider 16 of the counter type described in White Patent 2,113,011. It divides the frequency by two to produce 100 μ. s. pulses. Also, an additional circuit is provided so that the divider 16 may be made to lose a "count" for the purpose of obtaining a different selected pulse repetition period.

The divider 16 (Fig. 2) comprises a counter circuit portion including an input or "bucket" capacitor 17, a pair of diodes 18 and 19, a "storage" capacitor 21 and a blocking oscillator portion 22. In adition, it includes a pair of diodes 23 and 24 associated with the storage capacitor 21 for the purpose of making the divider 16 lose a count upon the application of a pulse from a conductor 26 leading from a station selector switching circuit 14 as will be explained hereinafter. The blocking oscillator 22 comprises a vacuum tube 27 and a transformer 28 coupling the plate circuit to the grid circuit. The cathode circuit includes a biasing resistor 29, bypassed by a capacitor 31, and connected in series with a bleeder resistor 29'. A transformer 32 supplies the 100 μ. s. pulses from the divider 16 to a frequency divider 33 which also is of the type which may be made to lose one or more "counts."

The frequency divider 16 operates as follows: Each of the 50 μ. s. pulses of positive polarity from the oscillator 13 puts a predetermined charge on the comparatively large capacity storage capacitor 21 as a result of a pulse of current through the comparatively small "bucket" capacitor 17 and through the diode 19, the capacity of the capacitor 17 being small enough so that capacitor 17 receives full charge before the termination of an applied pulse. At the end of this current pulse, the capacitor 17 is discharged to ground potential through the diode 18. The next 50 μ. s. pulse puts an additional current pulse into capacitor 21, this raising the voltage across capacitor 21 sufficiently to trigger the blocking oscillator 22 whereby a pulse is produced across the transformer 28 as is well understood in the art. The pulse thus produced is applied to the divider 33 with positive polarity. At the same time, the blocking oscillator 22 discharges the capacitor 21 to bring it back to ground potential.

The frequency divider 33 divides the frequency by five to product 500 μ. s. pulses. It includes a counter portion comprising a "bucket" capacitor 36, a pair of diodes 37 and 38, and a storage capacitor 39. It also includes a blocking oscillator portion 41 comprising a vacuum tube 42, a feedback transformer 43, a biasing resistor 44 and a bypass capacitor 46.

As in the preceding divider 16, there is provided in the divider 33 a pair of diodes 47 and 48 for subtracting counts. In the divider 33, however, the application of a pulse from a conductor 49 will subtract one, two, three or four counts depending upon the position of a switch arm 67 which is operated by a knob 65' as well as the right-drift switch 96.

The 500 μ. s. pulses are supplied over a conductor 51 to a frequency divider 52 that divides by two to produce 1000 μ. s. pulses. The divider 52 is similar to the divider 16 with the count subtracting diodes omitted.

The 1000 μ. s. pulses are supplied to a frequency divider 56 that divides by five to produce 5000 μ. s. pulses which, in turn, are supplied to a frequency divider 59 that divides by four to produce 20,000 μ. s. pulses. The dividers 56 and 59 are similar to the divider 52 except for the difference in circuit constants.

The 20,000 μ. s. pulses may be passed through a clipping circuit 60 and supplied over a conductor 61 to a square wave generator 65 (Fig. 1), such as an Eccles-Jordan oscillator, for obtaining a square wave C (Fig. 8) having a repetition period of 40,000 μ. s. This square wave is then passed through a cathode follower tube 15 and from it are obtained, by means of suitable wave shaping and delay circuits described hereinafter, the desired driving or synchronizing pulses for the horizontal fast-sweep deflection.

The 20,000 μ. s. pulses are also supplied over a conductor 62 and through a "bucket" capacitor 63 (Fig. 2) of the first count subtraction circuit to a station selection switch 64; they are also supplied to the second count subtraction circuit through a coupling or blocking capacitor 66 of large capacity to a second station selection switch 67 which is ganged with the switch 64 as indicated by the broken line 68, the two switches being operated by the knob 65'.

At the switch 64, alternate switch contact points are connected to the feedback conductor 28 whereby at these switch point positions the 20,000 μ. s. pulses are fed back to the divider 16 to subtract counts. It may be desirable because of distributed or stray leakage in the switch 64 or capacitor 63 to connect the switch arm 64 to ground through a 1 megohm resistor 55 to permit charges to leak off.

At the switch 67, the last six contact points are connected in pairs, the three pairs of contact points #2—#3, #4—#5 and #6—#7 being connected through "bucket" capacitors 71, 72 and 73, respectively, to the feedback conductor 49 which leads to the second count subtraction circuit. Thus, with switch 67 in any one of the last six positions, 20,000 μ. s. pulses are applied to the divider 33 to subtract counts.

Before discussing in detail the operation of the count subtracting circuits for station selection, it may be noted that the desired timing marker pulses are obtained at various points along the frequency divider circuit. In the present system, the 10 μ s. pulses are supplied from the blocking oscillator 12 to an output lead 81. 50 μ. s. pulses are supplied to the lead 192. The 100 μ. s. and 1000 μ. s. pulses are supplied to output leads 194 and 197, respectively. 1000 μ. s. pulses are also supplied through an output lead 217 to a lead 219 which is also supplied with 5000 μ. s. pulses. The 500 μ. s. pulses are supplied to an output lead 100. The marker pulses are applied through circuits hereinafter described to the vertical deflecting plates of a cathode-ray tube 129. The cathode ray of the tube 129 is deflected horizontally by either a slow-sweep or a fast-sweep deflecting wave that is in synchronism with the 40,000 μ. s. square wave from the Eccles-Jordan oscillator 65 (Fig. 1). It is evident that the 40,000 μ. s. horizontal deflection cycle has a fixed time relation to the timing marker pulses.

COUNT SUBTRACTION FOR STATION SELECTION

Referring now more particularly to the feature of subtracting counts for the purpose of station selection, specific pulse repetition rates for a plurality of pairs of ground transmitter stations will be used by way of example to aid in explaining the operation.

It will be assumed that the first pair of ground stations transmit the A pulses with a repetition period of 40,000 μ. s. and transmit the B pulses with a like repetition period; that the second pair of ground stations transmit A and B pulses having a repetition period of 39,900 μ. s.; that the third pair transmits 39,800 μ. s. pulses; that the fourth pair transmits 39,700 μ. s. pulses, etc. It is apparent that for station selection at the receiving apparatus, the operator must be able to select corresponding repetition periods for the output of the square wave generator 65 which controls the cathode ray deflection cycle; namely, periods of 40,000 μ. s.; 39,900 μ. s.; 39,800 μ. s.; 39,700 μ. s.; 39,699 μ. s.; etc.

It will be noted that the several repetition periods differ from each other by 100 μ. s. or by integral multiples thereof, and that this corresponds to repetition period differences of 50 μ. s.

or integral multiples thereof at the output of the frequency divider chain, i. e., at the input of the clipper 60. Therefore, the desired repetition period can be obtained by shortening the 20,000 μ. s. period by 50 μ. s., by 100 μ. s., by 150 μ. s., etc.

For example, to obtain the 39,900 μ. s. repetition period the switches 64 and 67 are moved to the #1 switch contact points. At this switch position the 20,000 μ. s. pulses from the lead 62 are fed back by way of the "bucket" capacitor 63, the switch 64 and the conductor 26 to the frequency divider 16 only. Upon the occurrence of a 20,000 μ. s. pulse, it produces a pulse of current through the "bucket" capacitor 63 and through the diode 23 to add a charge to the storage capacitor 21. At the end of the pulse, the capacitor 63 discharges through the diode 24 to its original potential. By properly selecting the capacity value of the "bucket" capacitor 63, the added charge is made equal to the charge which is added to the capacitor 21 by a single 50 μ. s. pulse. Thus, the 20,000 μ. s. pulse causes the blocking oscillator 22 to fire one pulse earlier or 50 μ. s. sooner than it normally would whereby the desired repetition period of 19,950 μ. s. at the clipper 60 or 39,900 μ. s. at the output of the E—J oscillator 65 is obtained. It may be noted that, in the example given, each time a 20,000 μ. s. pulse occurs, the divider 16 divides by one instead of by two.

To obtain the 39,800 μ. s. repetition period, the switches 64 and 67 are moved to position #2. Now the 20,000 μ. s. pulses are applied through the "bucket" capacitor 71 to the divider 33 and upon the occurrence of a 20,000 μ. s. pulse it applies a charge to the capacitor 39 through the diode 48. At the end of the pulse the capacitor 71 discharges through the diode 47 to its original potential. The capacitor 71 is given a capacity value such that this charge applied by the 20,000 μ. s. pulse is equal to the charge applied by a single 100 μ. s. pulse. Thus, upon the occurrence of a 20,000 μ. s. pulse the blocking oscillator 41 fires one pulse early or 100 μ. s. sooner than it normally would whereby the desired repetition period of 19,900 μ. s. is obtained at the clipper 60 and a repetition period of 39,800 μ. s. is obtained at the output of the E—J oscillator 65. It may be noted that in the example given, the divider 33 divides by four instead of by five upon the occurrence of each 20,000 μ. s. pulse.

To obtain the 39,700 μ. s. repetition period, the switches 64 and 67 are moved to the #3 position, this being the switch position shown in the drawing. Now the 20,000 μ. s. pulses are applied to both the divider 16 and the divider 33 through the switches 64 and 67 whereby both dividers lose a count. Specifically, the blocking oscillators 22 and 41 of dividers 16 and 33 fire 50 μ. s. and 100 μ. s. early, respectively, or a total of 150 μ. s. early. Thus, the desired repetition period of 2×19,850 μ. s. or 39,700 μ. s. is obtained at the E—J oscillator output.

To obtain the 39,600 μ.s. repetition period, the switches 64 and 67 are moved to the #4 position. Again, the 20,000 μ. s. pulses are applied to the divider 33 only, but this time through the capacitor 72 which has a capacity value such that a 20,000 μ. s. pulse causes the divider 33 to lose two counts, i. e., to trigger 200 μ. s. early. Thus, the desired period of 2×19,800 μ. s. or 39,600 μ. s. is obtained at the E—J oscillator.

At the #5 switch position, the divider 16 again triggers 50 μ. s. early and the divider 33 triggers 200 μ. s. early, or a total of 250 μ. s. for the two dividers. Thus, the repetition period is 19,750 μ. s. at the input to clipper 60 or 39,500 μ. s. at the output of the E—J oscillator 65.

At the #6 switch position, only the divider 33 receives the 20,000 μ. s. pulses. These pulses are applied through the capacitor 73 which is adjusted to make the divider 33 lose three counts. Thus, it triggers 300 μ. s. early to give a repetition period of 2×19,700 μ. s. or 39,400 μ. s. at the E—J oscillator output.

At the #7 switch position, both of the dividers 16 and 33 lose counts, divider 16 triggering 50 μ. s. early and divider 33 triggering 300 μ. s. early, or a total of 350 μ. s. whereby the repetition period is 19,650 μ. s. at the clipper 60 or 39,300 μ. s. at the E—J oscillator output.

It may be preferred to employ a different group of repetition periods than the group of 40,000 μ. s., 39,900 μ. s., etc. assumed above. By making the final divider stage 59 divide by three, for example, instead of by four, the divider chain output pulses have a repetition period of 15,000 μ. s. so that a group of repetition periods of 30,000 μ. s., 29,900 μ. s., etc. may be employed. Or the divider stage 59 may be made to divide by five to obtain a group of repetition periods of 50,000 μ. s., 49,900 μ. s., etc.

In order to obtain a more rapid right "drift" of the A and B pulses in the preliminary steps of obtaining a time difference reading, it may be desirable to provide a capacitor 95 that may be connected by a switch 96 to the coupling capacitor 66 so that by closing the switch 96 additional counts will be lost by the divider 33. Thus, the A and B pulses may be drifted toward the right by closing the switch 96. When the switch 96 is opened the A and B pulses stop drifting and again are stationary.

CATHODE RAY TRACE AND TIMING MARKER PRESENTATION

Before describing that portion of the receiving apparatus of Fig. 1 to which the timing marker and control pulses from the pulse generator unit are applied, reference will be made to Fig. 9.

Figures 5, 7:
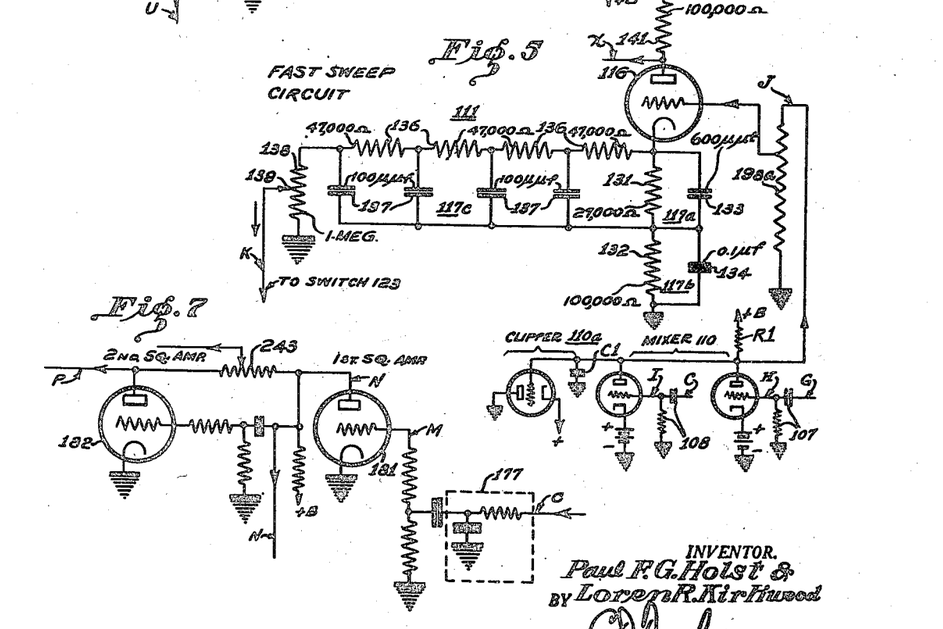
Figure 7 is a circuit diagram of the square wave amplifiers that are included in the apparatus of Fig. 1.
Figures 5A, 9:
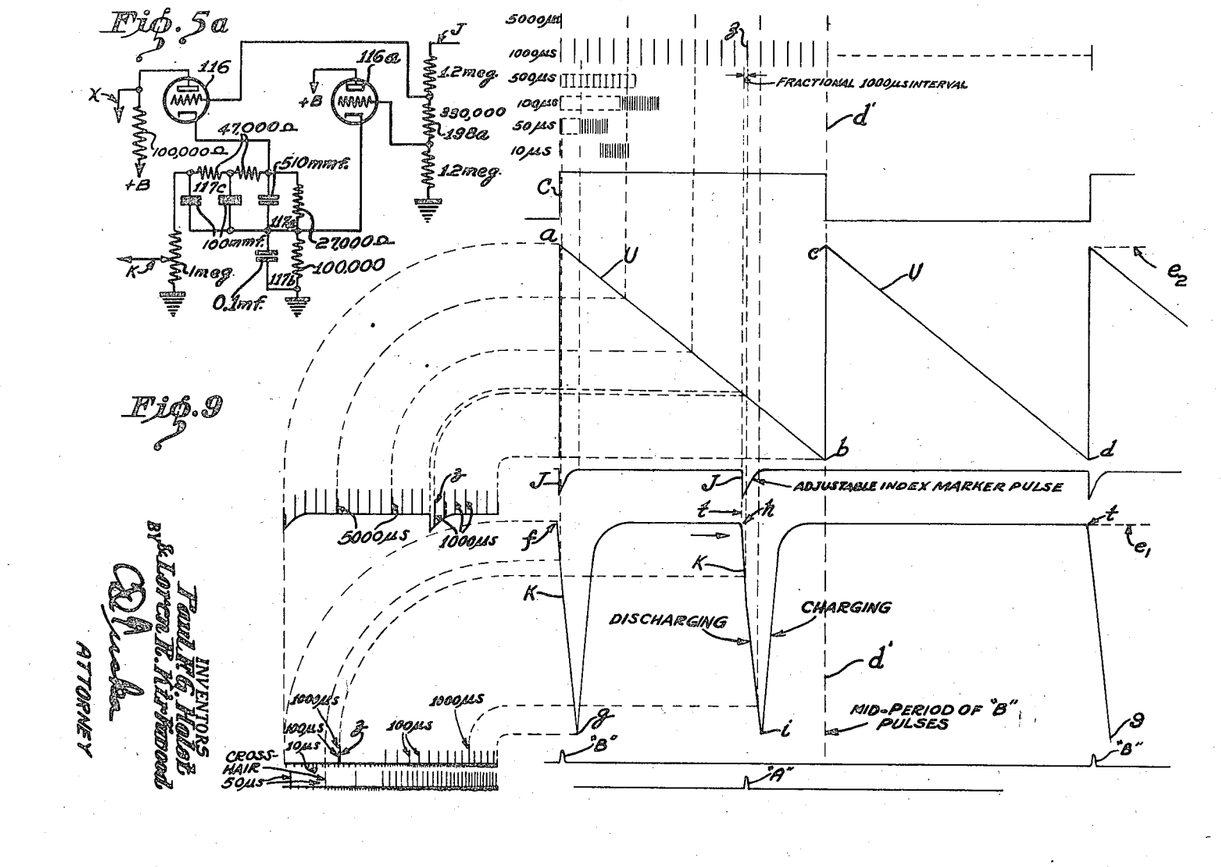
Figure 5a is a circuit diagram of an improved fast-sweep deflecting circuit.
Figure 9 is a view showing the relation of the cathode-ray traces with respect to the horizontal deflecting waves and also with respect to the timing marker pulses.

In Fig. 9, the graphs U and K show the wave shapes of the slow-sweep and fast-sweep horizontal deflecting waves, respectively, for obtaining the desired cathode ray traces. The wave J comprises a pair of recurring pulses, the second of which (referred to as the variable index marker) is adjustable in time and determines the starting time $t$ of the wave $h-i$ of the graph K. The starting time $t$ of the variable index marker in relation to the fixed index marker may be adjusted by adjusting two delay multivibrators 101 and 102 by knobs 101' and 102' (Fig. 1), as will be explained hereinafter, for aligning the A and B pulses. Three switching positions identified as positions #1, #2 and #3 are used successively in aligning the A and B pulses. It will be understood that while the pulses A and B and their corresponding fast-sweep traces appear alternately on the cathode-ray tube screen, they appear to the eye to occur simultaneously because of persistence of vision, lag of phosphorescence of the screen or both.

Figure 8:
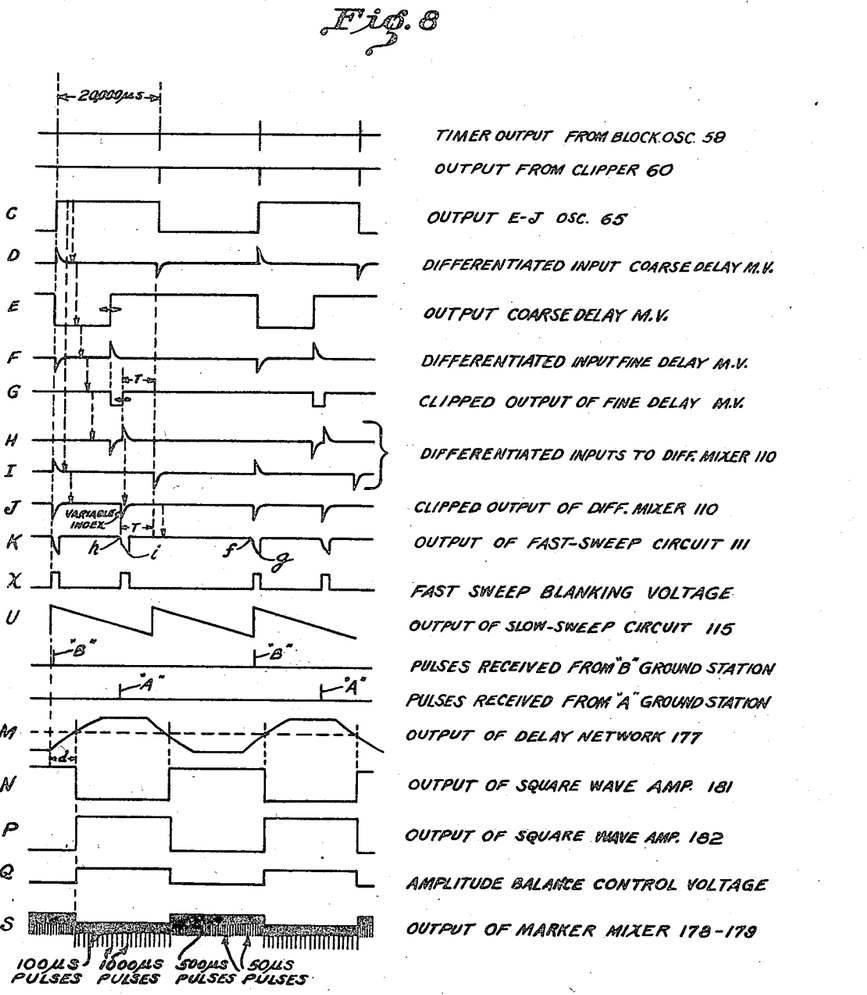
Figure 8 is a group of graphs which are referred to in explaining the operation of the system shown in Fig. 1.

As shown in Figs. 8 and 9, the B pulse is the one that occurs after the mid-point of the A pulse period, and consequently the time interval, which elapses between the occurrence of a B pulse and the succeeding A pulse will be less than one half pulse interval. As will be seen in Fig. 9, the start of one fast sweep coincides with the start of a slow trace, while the start of the other fast sweep coincides with the variable index marker.

As already explained a momentary change of the recurrence rate will change the location of the pulses on the trace. Specifically, it is possible for the operator to locate the B pulse at the left side of the lower slow trace, which in turn will cause the A pulse to fall to the right of the B pulse on the same trace, and the variable index marker may be made to coincide with the A pulse. Therefore, when the function switch is turned to position #2, the B pulse will occur during the trace described by the fixed fast-sweep deflecting wave $f$—$g$, while the A pulse will occur during the trace described by the variable fast-sweep deflecting wave $h$—$i$.

A finer adjustment will permit the operator to align the pulses so that the time elapsed between the start of the respective fast sweeps and the corresponding pulses are equal and occurs during the expanded parts of the traces, thereby providing good accuracy for determining the time delay. This feature is claimed broadly in copending application Serial No. 560,648, filed October 27, 1944, patented November 11, 1947, Patent No. 2,430,570, in the name of George D. Hulst, Jr., and entitled Radio navigation system.

Figures 12, 13, 14:
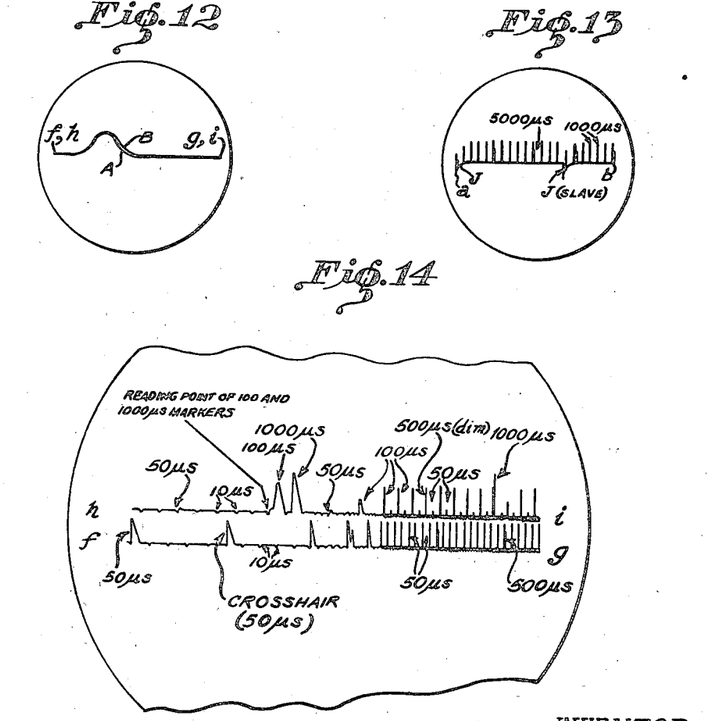
Figure 12 is a view showing the fast-sweep traces of Fig. 11 superimposed or collapsed for the final alignment step and showing the A and B pulses exactly aligned and superimposed.
Figure 13 is a view of the lower slow-sweep trace on the cathode-ray tube indicator screen (the upper trace being blanked out) and with the variable index marker and the 5000 μ. s. and 1000 μ. s. timing marks on the lower trace for obtaining the time reading in 1000 μ. s. intervals.
Figure 14 is a view of the two fast-sweep traces on the cathode-ray indicator tube screen with 1000 μ. s., 100 μ. s. and 10 μ. s. timing marks on the upper trace and with a 50 μ. s. cross-hair mark on the lower trace for obtaining the time reading of the fractional 1000 μ. s. interval.

In the present system, after the A and B pulses have been aligned, the timing mark counting is done by switching first to the slow-sweep trace to count 1000 $\mu$. s. intervals by means of 1000 $\mu$. s. pulses and then to the fast-sweep trace to count the fractional 1000 $\mu$. s. interval by means of 100 $\mu$. s. and 10 $\mu$. s. pulses. More specifically, after the A and B pulses have been aligned with the receiver switched successively to operating positions #1, #2 and #3, the receiver is switched to a #4 operating position for obtaining the count of 1000 $\mu$. s. intervals. In the #4 position, the upper trace corresponding to $c$—$d$ is blanked out by a blanking wave L and the 1000 $\mu$. s. and 5000 $\mu$. s. timing markers are made to appear on the remaining slow-sweep trace. Referring to Fig. 13, the desired time interval is determined approximately by counting the number of 1000 $\mu$. s. intervals from the variable index marker J to the right end of the trace. In the example shown in Fig. 9, this count is 6 intervals or 6000 $\mu$. s. It will be apparent that the time interval thus obtained is the amount that the starting time $t$ of the adjustable index marker J has been advanced in time with respect to the mid-period $d'$ (Fig. 9) of the deflecting wave cycle in order to align the A and B pulses. The time interval has not yet been determined exactly, however, because the fractional 1000 $\mu$. s. interval can be estimated only roughly on the slow-sweep scale.

To find the fractional 1000 $\mu$. s. interval exactly, the fast sweep is employed by switching to a #5 operating position and the 10 $\mu$. s., 100 $\mu$. s. and 1000 $\mu$. s. markers are made to appear on the resulting upper fast trace $h$—$i$ (illustrated in Fig. 14 and at lower left in Fig. 9) which is produced by the second fast-sweep wave $h$—$i$ of the deflecting wave K. The resulting lower fast trace $f$—$g$ (Figs. 9 and 14) is produced by the first fast-sweep wave $f$—$g$ of the deflecting wave K and on this lower trace 50 $\mu$. s. marker pulses are made to appear. The second of these 50 $\mu$. s. marks (counting left to right) is identified as the cross-hair marker.

The fractional 1000 $\mu$. s. interval is found by counting the 100 $\mu$. s. and 10 $\mu$. s. marks right to left on the upper trace and by estimating the number of microsecond units lying between the last counted 10 $\mu$. s. marker on the upper fast trace and the 50 $\mu$. s. cross-hair marker on the lower fast trace and adding 100 $\mu$. s. as explained more fully hereinafter. This counting starts from the first 1000 $\mu$. s. mark appearing to the right of the cross-hair marker. This reading in Fig. 9 is 25 $\mu$. s., and the result is 125 $\mu$. s.

Before describing the method of operation in more detail, the receiver system as illustrated in Fig. 1 will be further described.

DESCRIPTION OF CATHODE RAY TRACE PRODUCING CIRCUITS, MIXING CIRCUITS, ETC., OF FIG. 1

Referring to Fig. 1 and to the graphs of Figs. 8 and 9, the output of the 20,000 $\mu$. s. blocking oscillator is supplied over a conductor 61a and through a polarity reversing transformer 60a and a lead 61b to a slow-sweep deflecting circuit 115 for producing the sawtooth voltage wave U.

The output of the clipper is supplied to the Eccles-Jordan oscillator 65 whereby it is triggered by the 20,000 $\mu$. s. pulses supplied to produce a rectangular voltage wave which appears at the output of a cathode follower tube 15 as the wave C. Timing pulses from the counters of the pulse generator unit are shown at the top of Fig. 9.

The wave C is supplied over a conductor 198 to a differentiating circuit 105 to produce a wave D which triggers a coarse delay multivibrator 101. The output of the multivibrator 101 is a rectangular wave E and the back edge of the narrow pulse portion of this wave is adjustable by means of the knob 101'. In order to obtain a more precise timing adjustment than can be made at the multivibrator 101, the wave E is supplied to a differentiating circuit 106 to produce a wave F which triggers a fine delay multivibrator 102 to produce a rectangular wave which appears as the wave G after passing through a clipper 200. The back edge of the narrow pulse portion of the wave G is adjustable by means of a knob 102'. This timing of the back edge controls the starting time $t$ of the variable index marker J and of the second sweep portion $h$—$i$ of the fast-sweep deflecting wave K as will soon be apparent. The multivibrators 101 and 102 may be any one of several well known types such as, for example, the one described in British Patent 456,840 to White and in the A. I. E. E. for June 1941, vol. 60, pp. 371 to 376. To obtain an accurately timed back edge of the delay pulse from the multivibrator 101 with respect to the timing marker pulses, 5000 $\mu$. s. lock-in pulses from the counter 33 are supplied over leads 100 and 100a to the multivibrator 101.

Figure 6:
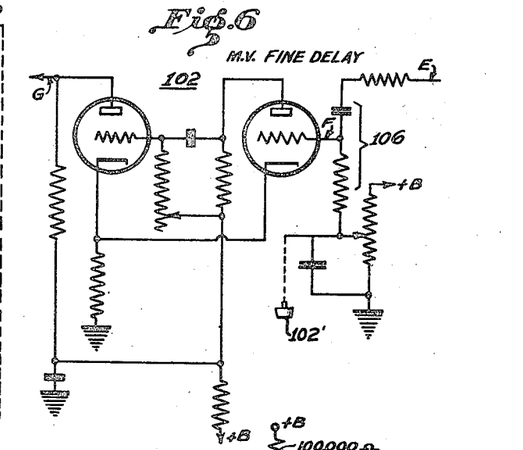
Figure 6 is a circuit diagram of the fine delay multivibrator that is included in the system of Fig. 1.

Fig. 6 shows one suitable type of delay multivibrator. This figure illustrates the fine delay multivibrator 102 which comprises two vacuum tubes having cathode coupling as taught in Potter Patent 2,157,434. The back edge of the narrow output pulse G may be adjusted by means of the knob 102' which varies the positive bias on the grid of the tube to which the wave F is applied.

The clipped wave G from the multivibrator 102 and clipper 200 is passed through a differentiating circuit 107 to produce a differentiated wave H which, after passing through a mixer circuit 110, and a clipping circuit 110a, appears as the second and fourth pulses of the wave J in the illustration of Fig. 8. These pulses are the variable index marker pulses. Likewise, the wave C from the cathode follower 15 is supplied by way of conductors 198, 201 and 202 to a differentiating circuit 108 to produce the differentiated wave I which, after passing through the mixer 110 and the clipping circuit 110a, appears as the first and second pulses of the wave J in the illustration of Fig. 8. The mixer circuit 110 and the clipping circuit 110a, as indicated above, function to clip off the negative pulses of waves H and I and to mix the remaining clipped positive pulses. Thus, the wave J is obtained at the output of clipper 110a. The mixer 110, which may consist of two vacuum tubes having a common anode resistor as shown in Fig. 5, reverses the polarity of the pulses. It will be seen that the front edges of alternate pulses of the wave J (second and fourth pulses in the illustration) coincide with the back edges of the wave G and are adjustable therewith. The waves in the plate circuit of the mixer 10 are of equal amplitude due to operation of tubes in a condition where grid and plate voltage approach equal amplitude. The width of the differentiated incoming pulses is short compared to that of the plate pulses, the width of the latter being controlled by a capacitor-resistor combination in the plate circuit and therefore being independent of the width of the incoming wave. This capacitor-resistor combination comprises a capacitor C1 and the plate resistor R1.

The wave J is supplied to the fast-sweep deflecting circuit 111 shown in detail in Fig. 5 and described hereinafter. The narrow negative pulses of wave J produce the fast-sweep wave K having the useful deflecting portions f—g and h—i. The deflecting waves U and K are applied from the circuits 111 and 115 through a wave selecting switch 123 and through a horizontal deflecting amplifier 124 to the horizontal deflecting plates 128 of the cathode-ray indicator tube 129. As described in copending application Serial No. 589,320, filed April 20, 1945, in the names of Garrard Mountjoy, George D. Hulst, Jr., and Earl Schoenfeld, and entitled Radio navigation system, the horizontal deflecting amplifier 124 may be provided with a switch (not shown) for changing the bias on the amplifier tubes when the function switch is changed from the slow-sweep position to the fast-sweep position and vice versa, thereby insuring optimum efficiency and undistorted gain from the amplifier tubes.

The switch 123 has five contact points and five corresponding switch positions, referred to as operating positions, which are identified, reading clockwise, as positions #1, #2, #3, #4 and #5. There are six other operation position switches, described hereinafter, that likewise have these five switch positions and which are ganged with the switch 123.

Switch 123, when in operation positions #1 and #4, functions to apply the slow-sweep wave U to the horizontal deflecting plates 128 and, when in operation positions #2, #3 and #5, functions to apply the fast-sweep wave K to the deflecting plates 128.

The fast sweep circuit

Referring more specifically to the circuit 111 for producing the fast-sweep wave K, as shown in Fig. 5 the circuit comprises a vacuum tube 116 and a pulse shaping network that comprises two sections consisting of cathode resistors 131 and 132 shunted by capacitors 133 and 134, respectively, identified as network sections 117a and 117b. The shaping network further comprises a delay line section 117c comprising series resistors 136 and shunt capacitors 137 connected across the cathode resistor 131 and terminated in a resistor 138 and in the cathode resistor 132. The fast-sweep wave K is taken off the resistor 138 through an adjustable tap 139, the setting of which determines the amplitude of the wave K.

In operation, the capacitors of the network sections 117a and 117b are charged through the anode resistor 141 and the tube 116 to a certain voltage level between successive pulses of the wave J to bring the tap 139 to the voltage $e_1$. Upon the occurrence of each negative pulse of the wave J, the tube 116 is driven to cut-off and the capacitors 133 and 134 discharge through the resistors 131 and 132, respectively. The section 117a comprising capacitor 133 and resistor 131 has a fast time constant whereby the discharge of capacitor 133 produces a voltage of steep slope across resistor 131. The section 117b comprising capacitor 134 and resistor 132 has a slower time constant whereby the discharge of capacitor 134 produces a voltage of less slope across resistor 132. These two voltages of different slopes appear at the tap 139 as the sum of the two voltages with the voltage of the steeper slope slightly delayed by the delay network section 117c. One reason for providing this slight delay of a few microseconds (50 μ. s. in the example shown) is to make the 50 μ. s. cross-hair mark fall at a suitable point on the expanded portion of the fast sweep. The wave form of the wave K following the 50 μ. s. delay is approximately logarithmic.

It should be understood that the fast-sweep wave K need not be of the wave form described and, in fact, may be linear although some form of increased expansion at the left end of the fast-sweep trace must be provided for the accuracy desired in the present embodiment of the invention. Such expansion may be obtained by employing either a logarithmic wave shape or an exponential wave shape, for example.

The above-described fast-sweep deflecting circuit is described and claimed in application Serial No. 583,255, filed March 17, 1945, in the name of George D. Hulst and entitled Cathode ray deflection circuit.

As previously noted, the starting time $t$ of the second fast-sweep wave h—i is determined by the adjustment of the back-edge of the wave G (and in turn by the variable index marker J) whereby the start of the wave h—i may be made to precede the received A pulse by the same amount that the start of the wave f—g precedes the received B pulse, this being the condition of alignment of the A and B pulses. It should also be noted that the wave f—g is identical with the wave h—i whereby exact alignment of the A and B pulses on the cathode-ray traces is obtained (as shown in Fig 12) when the above-described timing relation exists.

IMPROVED FAST-SWEEP CIRCUIT

Fig. 5a shows an improved fast-sweep deflection circuit which is the one preferably employed in our navigation system. It is similar to the circuit of Fig. 5 but has an additional tube 116a that is so connected into the circuit as to greatly improve the recharging characteristic of the circuit. More specifically, referring to the graph K of Fig. 9, the charging portions of the wave K immediately following the discharging portions f—g and h—i are steeper with the improved circuit of Fig. 5a than with the circuit of Fig. 5. Thus, the deflecting circuit network is brought to the full charge voltage level $e_1$ in such a short time that is always charged to the level $e_1$ before the deflecting wave portions f—g and h—i occur even if these portions are separated by only short time intervals.

In Fig. 5a the vacuum tube 116a has its cathode connected to the junction point of the resistors in the networks 117a and 117b so that the capacitor of network 117b may be charged through the tube 116a. The anode of the tube 116a is connected directly to the +B voltage. The grids of the tubes 116 and 116a are connected to points on a potentiometer resistor 198a with the grid of the tube 116a connected to a point of slightly lower voltage. The wave J is applied to the resistor 198a with negative polarity and with sufficient amplitude to drive the tubes 116 and 116a rapidly to plate-current cut-off. It may be noted that in the absence of the pulses J the grids of the tubes 116 and 116a are less positive with respect to ground than their cathodes; however, the resulting bias is less than that required to bias the tubes to plate current cut-off.

In operation, the tube 116a produces by means of its cathode coupled circuit the lesser slope of the wave f—g and h—i and thus the slow portion of the sweep. The tube 116, from a portion of its cathode circuit, produces the steep slope for the expanded portion of the sweep. When the negative pulses J are applied to the grid of tube 116a, the grid is driven negative beyond the cut-off value during a large portion of the pulse duration. During the period of cut-off, the tube 116a draws no current, and the capacitor of network 117b is discharged through the resistor of this network at a rate determined by the time constant of resistor and capacitor. This time constant is long compared to the cut-off interval, and the discharge cycle is interrupted before completion, when the grid returns to its steady state potential, at a value above the cut-off point. The capacitor of network 117b is then recharged through the tube 116a at a much faster rate, determined primarily by the internal resistance of this tube.

The grid of the tube 116 receives the pulses J which differ from those applied to the tube 116a only by this greater amplitude. The tube 116 also normally draws plate current sufficient to develop a cathode bias through the two resistors of networks 117a and 117b and to charge the capacitor of network 117a to a fixed fraction of the steady state cathode potential. When the negative pulses J are applied to the grid of tube 116, the tube 116 is cut off during part of the pulse duration. During the cut-off period, the capacitor of network 117a discharges through the resistor of this network at a rate determined by the time constant of the capacitor and resistor. As this time constant is short compared to the cut-off period, complete discharge occurs in the early part of this period. No further action occurs until the grid of tube 116 returns to a value above the cut-off point and the tube 116 again draws current. When tube 116 draws current, the capacitor of network 117a is recharged through the plate resistor of the tube 116 to its original potential. The resulting voltage thus developed across the capacitor-resistor network 117a is the steep portion of the wave f—g or h—i.

Since the capacitor of network 117a discharges during the cut-off period, lowering the cathode potential of tube 116a to a potential equalling that across the capacitor of network 117b, which is also varying, the voltage developed at the cathode of the tube 116 is the sum of the voltages appearing across the two networks 117a and 117b. This voltage wave consists of a steeply sloping leading edge, developed by the rapid discharge of the capacitor of network 117a and an abrupt change to a more gradual slope, developed by the discharge of the capacitor of network 117b. As the recharge period for both capacitors of networks 117a and 117b begins at approximately the same time, a steeply sloping return swing is imparted to the combined wave as desired.

It may be noted that cut-off occurs at a different level on the negative and positive swings since cathode potential changes during the cut-off period, changing the cathode bias, and placing the point of cut-off at the new level with respect to the grid potential. Due to the difference in the shape of the cathode voltage between the tubes 116 and 116a during cut-off, the change in cut-off value is different for the two tubes, the greater change occurring in tube 116. By applying a larger negative grid pulse to the tube 116 than to the tube 116a, this effect is balanced so that the cut-off period for both tubes ends at nearly the same time; but tube 116 is always slightly ahead of tube 116a, thus placing tube 116 in control of the length of the sweep.

As stated in connection with Fig. 5, the start of the fast sweep should be delayed slightly with respect to the starting edges of the controlling pulses J from the differential mixer 110. Two resistor-capacitor sections comprising the network 117c provide the means which produces this delay. This network has a frequency response less than that required to pass the high frequency components developed by the abrupt start of the fast-sweep wave. As a result, the wave which does pass is modified by the network, starts gradually, producing the desired time delay at the start of the steep portion of the wave front. Except for incidental rounding of the other sharp corners, the remainder of the pulse shape is unaffected.

The improved fast-sweep circuit of Fig. 5a is described and claimed in our copending application Serial No. 674,184, filed June 4, 1946, and entitled Deflecting circuits.

The slow-sweep circuit

Figure 4:
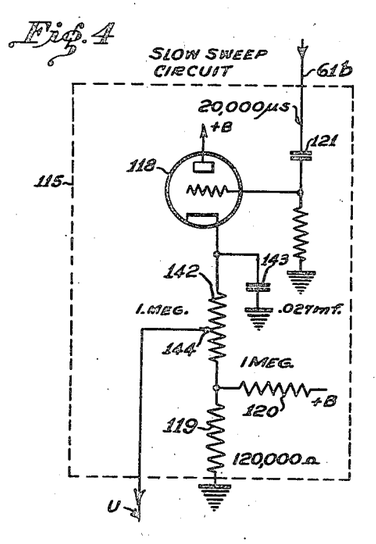
Figures 4 and 5 are circuit diagrams of the horizontal deflecting slow-sweep and fast-sweep circuits, respectively, employed in the system of Fig. 1.

Referring more specifically to the slow-sweep deflecting circuit 115, as shown in Fig. 4, it comprises a vacuum tube 118 and a network in the cathode circuit that comprises a cathode resistor 142 that has an adjustable tap 144 thereon and which is shunted by a capacitor 143. Positive bias is applied to the cathode of the tube 118 by connecting the lower end of cathode resistor 142 to the junction point of a pair of bleeder resistors 119 and 120. This prevents the tube 118 from drawing current at the end of the sawtooth cycle so that flattening of the sawtooth wave is avoided. The operation is as follows: Each time one of the positive 20,000 μ. s. pulses from the lead 61a is supplied through a polarity reversing transformer 60a (Fig. 1) and a lead 61b to the grid of the tube 118 by way of a coupling capacitor 121, the capacitor 143 is charged suddenly from the anode voltage supply through the tube 118 to a certain voltage level to bring the tap 144 to the voltage lever $e_2$ (Fig. 9). At the end of each positive pulse, the capacitor 143 discharges slowly through the resistors 142 and 119 thus producing successively the slow-sweep sawtooth wave portion a—b and the sawtooth wave portion c—d at the tap 144.

The radio receiver

Figure 10:
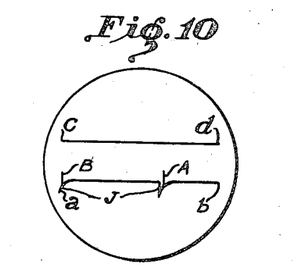
Figure 10 is a view of the slow-sweep cathode-ray traces appearing on the screen end of the cathode-ray indicator tube that is included in the apparatus of Fig. 1 and of the received pulses A and B as they appear on the lower trace when they are "aligned,"
Figure 11:
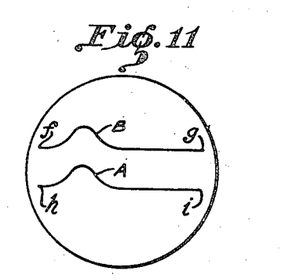
Figure 11 is a view of the fast-sweep cathode-ray traces on the cathode-ray tube indicator and of the received pulses A and B as they appear on the two fast-sweep traces, respectively, during the next step in obtaining more exact alignment of the A and B pulses.

The A and B pulses from a pair of ground stations (Fig. 3) are received by a radio receiver of the superheterodyne type comprising a radio frequency amplifier indicated at 161, a converter 162, an I.-F. amplifier 163 and a second detector and video frequency amplifier 164. The A and B pulses are supplied with positive polarity over a conductor 166 to the upper vertical deflecting plate 168. Thus, the A and B pulses may be made to appear, as shown in Figs. 10, 11 and 12, on the horizontal cathode-ray traces. The A and B pulses are made to appear with equal amplitude on the cathode-ray tube screen by employing a differential gain control circuit described hereinafter.

Slow-sweep trace separation

The slow-sweep traces a—b and c—d are separated as illustrated in Fig. 10 while the receiver is on the #1 operation position by means of the rectangular wave C (Fig. 8) supplied from the cathode follower tube (Fig. 1) over a conductor 169 to the #1 contact point of a timing marker and trace separation switch 171, and over a conductor 172 to the lower deflecting plate 170 of the cathode ray tube 129. Thus, the portion of the wave C, which is positive as it appears on the lower plate 170, holds the cathode ray deflected down a certain amount during the occurrence of the slow-sweep deflecting wave a—b.

Fast-sweep trace separation

The fast-sweep traces f—g and h—i are separated as illustrated in Figs. 11 and 14 during the #2 and #5 operation positions (fast-sweep positions) by means of rectangular waves P and N, respectively (Fig. 8). The waves P and N are obtained by passing the wave C from the cathode follower through a delay circuit 177 which, as shown in Fig. 7, may be a simple integrating circuit. The delayed wave M at the output of the delay circuit 177, referring to Figs. 1 and 7, is passed through a square wave clipper and amplifier 181 to obtain the wave N, and the wave N is then passed through a square wave clipper and amplifier 182 to obtain the wave P of opposite polarity. The waves N and P, which are identical except for polarity, are also utilized for "on" and "off" keying of a pair of timing marker mixer tubes 178 and 179 (Fig. 1) and for operation of a differential gain control circuit. These uses of waves N and P will be described hereinafter. The wave P is supplied over a lead 183 to the #2 contact point of the switch 171 while the wave N is supplied over a lead 184 to the #5 contact point of the switch 171 by way of a potentiometer resistor 187 having a variable tap 188 thereon, and through a resistor 189 and a conductor 191 to the #5 contact point. In the operation position #5, the amount of trace separation may therefore be adjusted by means of the variable tap point 188 to bring the cross-hair mark, shown in Figs. 9 and 14, in proper relation to the trace h—i on which the timing marks appear as will be described hereinafter.

From the foregoing it will be seen that suitable trace separation voltages are supplied to the lower deflecting plate 170 of the tube 129 by way of the switch 171 for the switch positions #1, #2 and #5.

APPLICATION OF TIMING PULSES TO CATHODE RAY TUBE

As shown in Figs. 13 and 14, certain timing pulses are made to appear on the traces of the cathode ray tube 129 when the ganged switches are on the #4 and #5 operation positions, respectively, these two positions being the ones for reading the full 1000 $\mu$. s. intervals and for reading the fractional 1000 $\mu$. s. interval, respectively. When the receiver is on either the #4 or the #5 position, the received pulses A and B do not appear on the cathode ray traces because a bias source 252 then supplies a negative voltage through a switch 250 and over a lead 249 to block the converter 162 and the I.-F. amplifier 163. When the receiver is on the A and B pulse alignment positions, i. e., positions #1, #2 and #3, the timing marks do not appear on the cathode-ray traces.

In the #5 switch position the 10 $\mu$. s. timing marks appear in both the cathode-ray traces in the "down" direction and are produced by negative 10 $\mu$. s. pulses applied from the blocking oscillator 12 over the conductor 81 and through a switch 80 and the lead 166 to the upper vertical deflecting plate 168. Likewise in the #5 switch position, the 50 $\mu$. s. timing marks appear on both the cathode-ray traces and are produced by positive 50 $\mu$. s. pulses applied from the blocking oscillator 13 over the conductor 192 through the capacitor 201b, then through capacitor 208 and lead 191.

Reference will now be made to the circuit for feeding timing pulses through the timing marker and trace separation switch 171 to the lower vertical deflecting plate 170.

100 $\mu$. s. and 1000 $\mu$. s. marker pulses are applied with positive polarity to the grid of the mixer tube 179 from the conductors 194 and 197 by way of coupling capacitors 196 and 196a and a lead 87.

50 $\mu$. s. marker pulses are applied with positive polarity to the grid of the mixer tube 178 from the conductor 192 carrying timing marker pulses from the counter 13, the marker pulses being applied to the grid through a capacitor 201a. Also, 500 $\mu$. s. marker pulses of positive polarity (these being the second kick of a blocking oscillator cycle) are applied to the grid of the tube 178 from a conductor 100 carrying timing marker pulses from the counter 33. It should be noted that 50 $\mu$. s. marker pulses applied to the grid of the mixer tube 178 are of such a magnitude that when tube 178 is conducting then the magnitude in the plate circuit will be several times more than the pulses supplied directly to the plate circuit through capacitor 201b.

The mixer tubes 178 and 179 are blocked alternately by the waves P and N of opposite polarities which are supplied from the conductors 184 and 202, respectively, to the grids of the tubes 178 and 179. The wave N is applied to the tube 178 through a resistor 203, while the wave P is applied to the tube 179 through a resistor 206.

From the foregoing, it will be seen that when the receiver is on the #5 position, the tube 179 passes 100 $\mu$. s. and 1000 $\mu$. s. marker pulses to the lower deflecting plate 170 of the cathode ray tube 129 during the occurrence of the fast-sweep wave h—i and while the tube 178 is blocked, and that the tube 178 passes the 500 $\mu$. s. marker pulses and the 50 $\mu$. s. marker pulses (one of which provides a cross-hair mark) to the said deflecting plate during the occurrence of the fast-sweep wave f—g and while the tube 179 is blocked. All these pulses appear on the lower plate 170 to make marks that are "up" on the cathode-ray traces. Brilliance marking is provided on every fifth 100 $\mu$. s. marker by means of 500 $\mu$. s. marker pulses that are fed with negative polarity over a lead 100a to the grid of the cathode-ray tube 129. The resulting marker presentation is that illustrated in Fig. 14. The method of counting the timing marks will be described hereinafter.

The mixer tubes 178 and 179 have a common anode resistor 207 and their timing pulse outputs are supplied to the lead 191 through a coupling capacitor 208. The tubes 178 and 179 are provided with grid leak resistors 209 and 213, respectively. The cathodes of tubes 178 and 179 are connected to a positive bias point on the bleeder resistors 212, 214 and 216.

In the #4 operation position, 1000 $\mu$. s. pulses of negative polarity from the 1000 $\mu$. s. pulse counter 52 are applied to the #4 contact point of the switch 171 by way of a conductor 217, a capacitor 218 and a conductor 219. These pulses appear on the lower deflecting plate 170 to produce marks that are "up" on the cathode-ray traces. Also, 5000 $\mu$. s. marker pulses are supplied through a resistor to conductor 219 to produce marks on the cathode-ray traces.

Slow-sweep and fast-sweep blanking

The slow-sweep trace c—d is blanked out when the receiver is on the #4 operation position for reading the 1000 $\mu$. s. intervals (Fig. 13). This reading is obtained by counting all the 1000 $\mu$. s. intervals appearing to the right of the variable index marker's front edge.

Referring now to the blanking circuit shown in Fig. 1 for blanking the trace c—d as described above, the wave C is supplied over the conductor 201 to the #4 contact point of a blanking switch 221. From contact point #4 the wave C is supplied through a conductor 222 and a coupling capacitor 223 to the anode of a diode 224, and over a conductor 226 to the control grid 227 of the cathode-ray tube 129. Thus, the wave C drives the cathode-ray tube 129 to electron beam cut-off during negative half cycle of the wave whereby only the trace a—b appears on the fluorescent screen as shown in Fig. 13.

Blanking is provided so that only the traces f—g and h—i appear on the cathode-ray screen when in the #2, #3 and #5 fast-sweep operating positions. This blanking is provided by means of the negative portions of the wave X as it appears on the anode of the tube 116 (Fig. 5) of the fast-sweep deflecting circuit 117. The wave X is supplied from the anode of tube 116 to the #2, #3, and #5 contact points of the switch 221 whereby in the #2, #3, and #5 operation positions, this wave is supplied over conductors 222 and 226 to the grid 227 of the cathode-ray tube.

Trace brilliance control

The diode 224 is provided to control the brilliance of the timing marks and traces on the cathode-ray tube screen by preventing changes in bias on the cathode-ray tube grid 227 due to the application of blanking pulses. A leak resistor 228 is connected across the diode 224 and the cathode of the diode 224 is connected to a variable bias voltage source (not shown).

In operation, during the periods that the blanking waves are positive at the anode of the diode 224, the impedance of the diode 224 is very low so that its anode is practically at the bias potential of its cathode. Thus, regardless of the form of the blanking wave and regardless of whether any blanking wave is being applied, the voltage on the grid 227 of the cathode-ray tube during the cathode-ray sweeps is substantially the voltage on the cathode of the diode 224.

DIFFERENTIAL GAIN CONTROL CIRCUIT

A differential gain control circuit for the R.-F. amplifier 161 of the radio receiver preferably is provided, as shown in Figs. 1 and 7, for the purpose of keeping the amplitudes of the A and B pulses substantially alike at the receiver output, thus facilitating the A and B pulse alignment. The gain control circuit includes a resistor 243 connected between the anodes of the square wave amplifier tubes 181 and 182. The waves N and P appear at the opposite ends of the resistor 243. An adjustable differential gain balance tap on resistor 243 may be moved to either side of the center thereof to decrease the gain of the R.-F. amplifier 161 during either the reception of the pulse A or the pulse B. The voltage at the gain balance tap is supplied through a capacitor 244 and a resistor 246 to the anode of a diode 247 and to the #2 and #3 contact points of a differential gain control switch 248. Thus, when the receiver is on either the #2 or #3 operation position for pulse alignment on the fast sweeps, the differential gain control voltage is applied through the switch 248 and a conductor 249 to the gain control grid of an amplifier tube in the R.-F. amplifier 161.

The differential gain control operation with the receiver on either #2 or #3 operation position is as follows:

When the gain balance tap is at the center of resistor 243, the waves N and P balance or cancel each other at the tap and no voltage wave is applied to the diode 247. When the tap is on one side of this balance position, a wave of one polarity, that of wave N, is applied to the diode 247; when the tap is on the other side of the balance point, a wave of the opposite polarity, that of wave P, is applied to the diode 247. The diode 247 functions to supply a negative bias during the negative half cycle following a positive cycle of an applied wave. For example, if the applied wave is the wave Q (Fig. 8) having the polarity of wave P, the positive half cycle causes diode current to charge capacitor 246, and during the following negative half cycle the capacitor 246 discharges slowly through a resistor 251 connected across the diode 247 thus making the anode of diode 247 negative with respect to ground and reducing the gain of the I.-F. amplifier 162 while the B pulse is being amplified.

It will be apparent that by delaying the waves N and P by means of the delay network 177 there is avoided the possibility of transient voltages causing a disturbance in the R.-F. amplifier 161 during the amplification of the pulse A or the pulse B, such transient voltage being produced when the waves N and P change from positive to negative polarity or vice versa. Likewise, switching disturbances in the mixer tubes 178 and 179 during the fast sweeps f—g and h—i are avoided.

With switch 248 on the #1 operation position for pulse alignment, normal operating bias is on the R.-F. amplifier 162. With the switch 248 on either the #4 or the #5 operation position for time marker reading, the grid of the R.-F. amplifier tube is connected to a negative potential to cut off this stage.

PROCEDURE IN MAKING A TIME MEASUREMENT

The successive steps in making a measurement of the time interval between the A and B pulses from a pair of ground stations will now be described.

ALIGNMENT OF A AND B PULSES

Position #1

After a particular pair of ground stations has been selected with the receiver set on #1 operation position, the A and B pulses will appear stationary on the two traces a—b and c—d. One of the pulses may appear on the upper trace c—d and the other on the lower trace a—b. At this point it is not known which one of the pulses is on a particular trace. A suitable drift switch such as switch 96 (Fig. 2) or knob 11 of oscillator 10 is now operated to drift both pulses onto the lower trace a—b with one pulse on the left end of the trace. The first occurring pulse, i. e., the left one, is the B pulse. That this is true will be evident by referring to Fig. 8 or Fig. 9.

Next, the starting time $t$ of the variable index marker J (Figs. 8 and 9) is adjusted by operating the controls 101' and 102' of the variable delay multivibrators 101 and 102 (Fig. 1) to bring the variable index marker J under the A pulse. The variable index marked J is now carefully adjusted so that its position with respect to the A pulse is substantially the same as the position of the first index marker J with respect to the B pulse.

Position #2

Next, referring to Fig. 11, the receiver is switched to the fast-sweep operation position #2 which results in the A and B pulses appearing on the traces h—i and f—g, respectively. As shown in Fig. 8, the start of the variable index marker pulse of wave J determines the start of the second fast-sweep portion h—i of wave K, the two starting practically simultaneously. By operating suitable drift switches such as the right-drift switch 96 (Fig. 2) or the knob 11 of the crystal oscillator 10, the A and B pulses are drifted to the left ends of the traces where they are on the more expanded portion of the fast sweeps. They are closely aligned as shown in Fig. 11 by operating the knobs 101' and 102' of the delay circuits 101 and 102.

Position #3

The final alignment of the A and B pulses is done on operation #3 with the two traces f—g and h—i superimposed as shown in Fig. 12. The front edges of the A and B pulses are now exactly aligned (they usually differ slightly in shape) by operating the knob 102' of the fine timing adjustment circuit 102 (Fig. 1). The time reading can now be made.

THE TIME DIFFERENCE READINGS

Position #4

Having aligned the A and B pulses, the receiver is switched to the #4 slow-sweep operation position whereby the 1000 μ. s. timing marks appear on the cathode ray tube screen (in the "up" direction from the trace a—b) as shown in Fig. 13. The full 1000 μ. s. intervals are found by counting all the 1000 μ. s. timing spaces appearing to the right of the front edge of the variable index marker J. In the example shown, the count is 6 spaces plus a fractional space or 6000 μ. s. plus some fraction of 1000 μ. s. The 5000 μ. s. marks also appear on the trace a—b to aid in counting the spaces. Fig. 9 shows the relationship of the deflecting wave U, the wave C and the 1000 μ. s. timing marks, and by graphical construction shows the resulting trace a—b and the timing marks thereon.

Position #5

For the final time reading to determine the fractional 1000 μ. s. interval, the receiver is switched to the #5 fast-sweep operation position whereby the 1000 μ. s., 100 μ. s. and 50 μ. s. timing marks appear in the "up" direction on the upper trace h—i and whereby the 500 μ. s. marks and the 50 μ. s. marks (one of the 50 μ. s. marks being the cross-hair mark) appear also in the "up" direction on the lower trace f—g as shown in Fig. 14. The 10 μ. s. pulses that are applied to the upper deflecting plate 168 cause 10 μ. s. marks to appear in the "down" direction on both traces.

The 100 μ. s. and 10 μ. s. intervals are obtained by counting (right to left) from the "reading point" (Fig. 14) to the front edge of the cross-hair mark. This "reading point" would be the front edge of the first 1000 μ. s. marker appearing to the right of the cross-hair mark except for the fact that due to some delay in the frequency dividers the 100 μ. s. marks and the 10 μ. s. marks do not occur simultaneously with the 1000 μ. s. mark. The cross-hair mark is the second 50 μ. s. mark from the left on the lower trace f—g.

The reading in the example of Fig. 14 for the 100 μ. s. intervals is 0 spaces and for the 10 μ. s. intervals (counting from the first 100 μ. s. mark to the right of the cross-hair) is 2 spaces. The number of microseconds in units between the last 10 μ. s. mark and the cross-hair is estimated at 5 μ. s. Thus, the reading in position #5 for the example of Fig. 14 is 25 μ. s. However, 100 μ. s. must be added for the reasons explained below so that the corrected reading is 125 μ. s.

The complete reading for the example illustrated in Figs. 8 and 9 is 6125 μ. s.

The reason for adding a 100 μ. s. interval at the start of the count as described above is to make up for the loss of a 100 μ. s. interval at the end of the count. The loss of an interval is due to the fact that the 50 μ. s. mark which is utilized as the cross-hair is 100 μ. s. from the start of the trace f—g. This will be better understood by referring to Fig. 9 where the microsecond reading is the same as in Fig. 14.

Fig. 9 shows the relationship of the fast-sweep deflecting waves f—g and h—i and the timing marker pulses, and by graphical construction shows the resulting traces h—i and f—g and the timing and cross-hair marks thereon.

The first feature to be noted in Fig. 9 is that the fast-sweep wave h—i occurs during the fractional 1000 μ. s. interval of the count that was made with the receiver in the #4 operation position. This fractional interval could be found accurately merely by counting 100 μ. s. and 10 μ. s. timing marks on the resulting trace h—i (i. e., counting from the 1000 μ. s. mark at the start of said interval over to the left end of the trace h—i) if the wave h—i (also the wave f—g) started at the time $t$ with sufficient expansion and also gave a well defined trace at the start. A more desirable procedure is to generate the wave h—i and f—g as described and count the timing marks on the upper trace h—i over to a cross-hair mark on the lower trace f—g, this being the second 50 μ. s. mark from the left end of said trace. Thus, any necessity for reading marks on the first 100 μ. s. portion of the fast-sweep traces is avoided. As previously stated, the 100 μ. s. interval lost by counting to the cross-hair mark instead of to the end of the trace is added as a correction to the actual count.

CHECKING OF COUNTER OPERATION

The reason for applying 500 μ. s. pulses from the lead 100 to the mixer tube 178 is to produce a 500 μ. s. mark on the lower fast-sweep trace *f—g* so that the operator may determine whether the counter feed-back circuits for station selection are operating properly. As previously explained, at 0 station position no time intervals are subtracted; at #1 station position, a 50 μ. s. interval is subtracted; at #2 station position a 100 μ. s. interval is subtracted, etc. These intervals are subtracted at the beginning of both the upper slow-sweep trace and the lower sweep trace and vary from a total of 50 μ. s. on #1 station position to 350 μ. s. on #7 station position.

To make a check on the feed-back operation, the 50 μ. s. pulses on the lower trace *f—g* are counted from the cross-hair mark to the first 500 μ. s. mark (counting left to right). On the 0 station position, between these two marks there should be eight 50 μ. s. intervals or seven 50 μ. s. marks, the eighth 50 μ. s. mark coinciding with the 500 μ. s. mark. On the #1 station position, there should be seven 50 μ. s. marks, on the #2 station position six 50 μ. s. marks, etc. If when the station selection switch is on the #2 position, for example, a check shows a number of 50 μ. s. marks other than six, then the operator knows that he must adjust the feed-back circuit to avoid selecting the wrong pair of ground stations.

We claim as our invention:

1. In a radio navigation system wherein a pair of periodically recurring radio pulses transmitted from a pair of spaced synchronized radio ground stations are received to determine the time difference of said pair of pulses at the point of reception and thereby locate a position line for the point of reception, means for producing a deflecting wave having the same repetition rate as said pair of pulses, a cathode ray tube having a screen, means for causing said deflecting wave to deflect the cathode ray of said tube to produce a trace on said screen, means for causing two successive pulses from said two stations, respectively, to appear on said trace with one of said two pulses at a predetermined position on said trace, means for producing an index marker pulse that is adjustable in timing with respect to said deflecting wave, and means for causing said marker pulse to produce an index marker on said trace whereby said marker may be moved into coincidence with the other of said two pulses appearing on said trace.

2. In a radio navigation system wherein a pair of periodically recurring radio pulses transmitted from a pair of spaced synchronized radio ground stations are received to determine the time difference of said pair of pulses at the point of reception and thereby locate a position line for the point of reception, means for producing a deflecting wave having the same repetition rate as said pair of pulses, a cathode ray tube having a screen, means for causing said deflecting wave to deflect the cathode ray of said tube to produce a trace on said screen, means for causing two successive pulses from said two stations, respectively, to appear on said trace with one of said two pulses positioned on the front end of said trace, means for producing an index marker pulse that is adjustable in timing with respect to said deflecting wave, and means for causing said marker pulse to produce an index marker on said trace whereby said marker may be moved into coincidence with the other of said two pulses appearing on said trace, means for producing timing pulses that are synchronized with said deflecting wave and means for causing them to make timing marks on said trace for marking off time intervals thereon whereby said time intervals which are between the front edge of said adjustable index marker and the other end of said trace may be counted to determine said time difference.

3. The invention according to claim 2 wherein said deflecting wave has a duration equal to one-half the repetition period of said pairs of transmitted pulses.

4. In a radio navigation system wherein a pair of periodically recurring radio pulses A and B transmitted from a pair of spaced synchronized radio ground stations, respectively, are received to determine the time difference of said pair of pulses and thereby locate a position line for the point of reception, said A pulse preceding the mid-point of the B pulse period by a predetermined amount at the points of transmission, time measuring means for determining the time interval from said mid-point of the B pulse period to the A pulse, said time measuring means including means for producing a deflection wave having the same repetition rate as said A and B pulses, means for producing pairs of index marker pulses, one of which occurs at approximately the same time as the start of said deflection wave and the other of which occurs at a time which may be varied and which also occurs during the occurrence of said deflecting wave, a cathode ray tube having a screen and means for deflecting the cathode ray of said tube by said deflecting wave to produce a trace on said screen, means for causing one of said A pulses and one of said B pulses to appear on said trace with the B pulse coincident with said one index marker pulse whereby said variable index marker pulse may be adjusted to a position of coincidence with said A pulse and whereby said time interval between said variable index mark and said mid-point may be determined.

5. In a radio navigation system wherein a pair of periodically recurring radio pulses A and B transmitted from a pair of spaced synchronized radio ground stations, respectively, are received to determine the time difference of said pair of pulses and thereby locate a position line for the point of reception, said A pulse preceding the mid-point of the B pulse period by a predetermined amount at the points of transmission, time measuring means for determining the time interval from said mid-point of the B pulse period to the A pulse, said time measuring means including means for producing a comparatively slow-sweep deflection wave recurring at the same repetition rate as that of said pair of pulses, means for producing pairs of index marker pulses, one of which occurs at approximately the same time as the start of the deflection wave and the other of which occurs at a time which may be varied and which also occurs during the occurrence of said deflecting wave, a cathode ray tube having a screen and means for deflecting the cathode ray of said tube by said deflecting wave to produce a slow-sweep trace on said screen, means for causing one of said A pulses and one of said B pulses to appear on said slow-sweep trace with the B pulse coincident with said one index marker pulse whereby said variable index marker pulse may be adjusted to a position of coincidence with said A pulse and whereby said time interval between said variable index mark and said mid-point may be determined, said time measuring means further including means for producing a pair of comparatively fast-sweep deflection waves, means for deflecting said cathode ray by said fast-sweep waves to produce fast-sweep traces on said screen, means for causing one of said fast-sweep waves to start at approximately the same time that said one index marker pulse occurs, means for causing the other of said fast-sweep waves to occur in response to the occurrence of said variable index marker pulse, and means for selectively switching either said slow-trace or said fast-trace producing means to an operating condition.

6. The invention according to claim 5 wherein each of said fast-sweep waves has a first-occurring portion that has a steeper slope than the later-occurring portion whereby the first part of the fast trace is expanded.

7. In a radio navigation system wherein a pair of periodically recurring radio pulses transmitted from a pair of spaced synchronized radio ground stations are received to determine the time difference of said pair of pulses at the point of reception and thereby locate a position line for the point of reception, means for producing a comparatively slow-sweep deflecting wave having a repetition rate equal to that of said pair of pulses, a cathode ray tube having a screen, means for causing said slow-sweep wave to deflect the cathode ray of said tube to produce a trace on said screen, means for causing two successive pulses from said two stations, respectively, to appear on said trace, means for producing an index marker pulse that is adjustable in timing with respect to said slow-sweep wave, means for causing said marker pulse to produce an index marker on said trace whereby said marker may be moved into coincidence with one of the station pulses appearing on said trace, a fast-sweep deflecting circuit for producing a fast-sweep deflecting wave, means for causing said fast-sweep wave to produce a trace on said screen, and means for causing said fast-sweep wave to start simultaneously with said index marker pulse.

8. The invention according to claim 7 wherein the first-occurring portion of said fast-sweep wave has a steeper slope than the later-occurring portion whereby the first part of the trace produced thereby is expanded.

9. In a radio navigation system wherein a pair of periodically recurring radio pulses transmitted from a pair of spaced synchronized radio ground stations are received to determine the time difference of said pair of pulses at the point of reception and thereby locate a position line for the point of reception, means for producing a comparatively slow-sweep deflecting wave having a repetition rate equal to that of said pair of pulses and having a duration substantially equal to one-half the time between successive pulses from one of said stations, a cathode ray tube having a screen, means for causing said slow-sweep wave to deflect the cathode ray of said tube to produce a trace on said screen, means for causing two successive pulses from said two stations, respectively, to appear on said trace, means for producing an index marker pulse that is adjustable in timing with respect to said slow-sweep wave, means for causing said marker pulse to produce an index marker on said trace whereby said marker may be moved into coincidence with one of the station pulses appearing on said trace, a fast-sweep deflecting circuit for producing a fast-sweep deflecting wave, means for causing said fast-sweep wave to produce a trace on said screen, and means for causing said fast-sweep wave to start in response to the occurrence of said index marker pulse.

10. In a radio navigation system wherein a pair of periodically recurring radio pulses transmitted from a pair of spaced synchronized radio ground stations are received to determine the time difference of said pair of pulses at the point of reception and thereby locate a position line for the point of reception, time determining means including a cathode ray tube and a comparatively slow-sweep deflection circuit for producing successive pairs of equal duration sawtooth waves for determining said time difference in terms of time intervals of a certain duration within a fractional part of one of said time intervals, means for adjusting the repetition rate of said pairs of waves to a repetition rate equal to said pairs of pulses, means for producing an index marker pulse that is adjustable in timing with reference to said sawtooth waves, time determining means including a comparatively fast-sweep deflection circuit for producing a fast-sweep deflecting wave for deflecting the cathode ray of said cathode-ray tube during said fractional part of a time interval and for determining said fractional part of a time interval in terms of smaller time intervals, said last means including means for causing said fast-sweep wave to occur simultaneously with said index marker pulse, and means for selectively switching either of said time determining means to an operating condition.

11. In a radio navigation system wherein a pair of periodically recurring radio pulses A and B transmitted from a pair of spaced synchronized radio ground stations, respectively, are received to determine the time difference of said pair of pulses and thereby locate a position line for the point of reception, said A pulse preceding the mid-point of the B pulse period by a predetermined amount at the points of transmission, time measuring means for determining the number of whole time intervals of a certain duration from said mid-point of the B pulse period to the A pulse, said time measuring means including a comparatively slow-sweep deflection circuit, said slow-sweep circuit comprising means for producing a deflecting wave having a repetition rate equal to that of said pair of pulses, means for producing an index marker pulse which occurs at a time that may be varied and which also occurs during the occurrence of said deflecting wave, a cathode ray tube having a screen and means for deflecting the cathode ray of said tube by said deflecting wave to produce a trace on said screen, means for causing said marker pulse to produce an index mark on said trace, means for causing one of said A pulses and one of said B pulses to appear on said trace with the B pulse near the start of said trace, and means for adjusting the timing of said variable index marker pulse to bring it into coincidence with said A pulse and whereby said time intervals between said variable index mark and the end of said trace may be determined thus determining the amount in time said A pulse is displaced with respect to said mid-point.

12. In a radio navigation system wherein a pair of periodically recurring radio pulses A and B transmitted from a pair of spaced synchronized radio ground stations, respectively, are received to determine the time difference of said pair of pulses and thereby locate a position line for the point of reception, said A pulse preceding the mid-point of the B pulse period by a predetermined amount at the points of transmision, time measuring means for determining the number of whole time intervals of a certain duration from said mid-point of the B pulse period to the A pulse, said time measuring means including a comparatively slow-sweep deflection circuit, said slow-sweep circuit comprising means for producing a deflecting wave having a duration substantially equal to one-half the time interval between successive B pulses, means for producing an index marker pulse which occurs at a time that may be varied and which also occurs during the occurrence of said deflecting wave, a cathode-ray tube having a screen and means for deflecting the cathode ray of said tube by said deflecting wave to produce a trace on said screen, means for causing said marker pulse to produce an index mark on said trace, means for causing one of said A pulses and one of said B pulses to appear on said trace with the B pulse near the start of said trace, means for adjusting the phasing of said variable index marker pulse to bring it into coincidence with said A pulse, there now being a fractional part of one of said time intervals adjacent to the A pulse that is yet to be determined, a second time measuring means including a comparatively fast-sweep deflection circuit for said cathode-ray tube for determining said fractional part of a time interval, said fast-sweep circuit comprising means for producing successively two fast-sweep deflecting waves, means for deflecting said cathode ray by said fast-sweep waves to produce fast-sweep traces on said screen, means for causing said two fast-sweep waves to occur during the occurrence of said B and A pulses, respectively, with one of said fast-sweep waves starting at a fixed time relative to the start of said slow-sweep wave and with the other of said fast-sweep waves starting substantially simultaneously with said variable index marker pulse, and means for selectively switching either of said time measuring means to an operating condition.

13. The invention according to claim 12 wherein means is provided for causing said one fast-sweep wave to start in response to the occurrence of said variable index marker pulse.

14. In a radio navigation system wherein a pair of periodically recurring radio pulses A and B transmitted from a pair of spaced synchronized radio ground stations, respectively, are received to determine the time difference of said pair of pulses and thereby locate a position line for the point of reception, said A pulse preceding the mid-point of the B pulse period by a predetermined amount at the points of transmission, time measuring means for determining the number of whole time intervals of a certain duration from said mid-point of the B pulse period to the A pulse, said time measuring means including a comparatively slow-sweep deflection circuit, said slow-sweep circuit comprising means for producing equal duration sawtooth waves each having a duration equal to one-half the time interval between successive B pulses, means for producing pairs of index marker pulses, one of which occurs at approximately the same time as the start of one of said sawtooth waves and the other of which occurs at a time which may be varied and which also occurs during the occurrence of said one sawtooth wave, a cathode-ray tube having a screen and means for deflecting the cathode ray of said tube by said sawtooth waves to produce traces on said screen, means for causing said marker pulses to produce index marks on the trace produced by said one sawtooth wave, means for causing one of said A pulses and one of said B pulses to appear on the trace produced by said one sawtooth wave with the B pulse coincident with said fixed index marker pulse whereby said variable index marker pulse may be adjusted to a position of coincidence with said A pulse and whereby said time intervals between said variable index mark and the end of the trace produced by said one sawtooth wave may be determined.

15. In a radio navigation system wherein a pair of periodically recurring radio pulses A and B transmitted from a pair of spaced synchronized radio ground stations, respectively, are received to determine the time difference of said pair of pulses and thereby locate a position line for the point of reception, said A pulse preceding the mid-point of the B pulse period by a predetermined amount at the points of transmission, time measuring means for determining the number of whole time intervals of a certain duration from said mid-point of the B pulse period to the A pulse, said time measuring means including a comparatively slow-sweep deflection circuit, said slow-sweep circuit comprising means for producing equal duration sawtooth waves each having a duration equal to one-half the time interval between successive B pulses, means for producing pairs of index marker pulses, one of which occurs at approximately the same time as the start of one of said sawtooth waves and the other of which occurs at a time which may be varied and which also occurs during the occurrence of said one sawtooth wave, a cathode ray tube having a screen and means for deflecting the cathode ray of said tube by said sawtooth waves to produce traces on said screen, means for causing said marker pulses to produce index marks on the trace produced by said one sawtooth wave, means for causing one of said A pulses and one of said B pulses to appear on the trace produced by said one sawtooth wave with the B pulse coincident with said fixed index marker pulse whereby said variable index marker pulse may be adjusted to a position of coincidence with said A pulse, there being a fractional part of one of said time intervals adjacent to the A pulse that is yet to be determined, a second time measuring means including a comparatively fast-sweep deflection circuit for said cathode-ray tube for determining said fractional part of a time interval, said fast-sweep circuit comprising means for producing successively two equal duration fast-sweep deflecting waves, means for deflecting said cathode ray by said fast-sweep waves to produce fast-sweep traces on said screen, means for causing said two fast-sweep waves to start substantially simultaneously with said fixed and variable index marker pulses, respectively, and means for selectively switching either of said time measuring means to an operating condition.

PAUL F. G. HOLST.
LOREN R. KIRKWOOD.

REFERENCES CITED

The following references are of record in the file of this patent:

UNITED STATES PATENTS

| Number | Name | Date |
|---|---|---|
| 2,403,600 | Holmes et al. | July 9, 1946 |
| 2,423,523 | Shmurak et al. | July 8, 1947 |